(12) United States Patent
Lissajoux et al.

(10) Patent No.: US 9,856,032 B2
(45) Date of Patent: Jan. 2, 2018

(54) METHOD AND DEVICE FOR CONTROLLING AT LEAST ONE ACTUATOR CONTROL SYSTEM OF AN AIRCRAFT, ASSOCIATED COMPUTER PROGRAM PRODUCT AND AIRCRAFT

(71) Applicant: THALES, Courbevoie (FR)

(72) Inventors: Sylvain Lissajoux, Toulouse (FR); Matthieu Claybrough, Toulouse (FR); Christophe Garnavault, Meudon la Foret (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/729,509

(22) Filed: Jun. 3, 2015

(65) Prior Publication Data

US 2015/0360789 A1 Dec. 17, 2015

(30) Foreign Application Priority Data

Jun. 16, 2014 (FR) ..................................... 14 01358

(51) Int. Cl.
*B64D 31/06* (2006.01)
*B64D 33/04* (2006.01)
*B64C 25/44* (2006.01)
*G01C 23/00* (2006.01)

(52) U.S. Cl.
CPC .............. *B64D 31/06* (2013.01); *B64C 25/44* (2013.01); *B64D 33/04* (2013.01); *G01C 23/00* (2013.01)

(58) Field of Classification Search
CPC ........ B64C 25/44; B64D 31/06; B64D 33/04; G01C 23/00; G05D 1/0808
See application file for complete search history.

(56) References Cited

U.S. PATENT DOCUMENTS

| | | | | |
|---|---|---|---|---|
| 5,079,711 A | * | 1/1992 | Lambregts et al. | ............... 701/3 |
| 6,246,929 B1 | | 6/2001 | Kaloust | |
| 6,262,674 B1 | * | 7/2001 | Wyatt | ........................... 340/975 |
| 2002/0036573 A1 | * | 3/2002 | Wyatt | ........................... 340/945 |
| 2006/0010972 A1 | * | 1/2006 | Brown | .................... B64C 19/00 340/959 |
| 2011/0238240 A1 | * | 9/2011 | Barral et al. | ..................... 701/14 |
| 2011/0238277 A1 | * | 9/2011 | Lacoste et al. | ................. 701/70 |

OTHER PUBLICATIONS

Search Report & Written Opinion dated Feb. 26, 2015 for French Patent Application dated 1401358, filed Jun. 16, 2014.

\* cited by examiner

*Primary Examiner* — Thomas G Black
*Assistant Examiner* — Ce Li
(74) *Attorney, Agent, or Firm* — Knobbe Martens Olson & Bear, LLP

(57) ABSTRACT

A method and device for controlling at least one actuator control system of an aircraft, an associated computer program product and aircraft are disclosed. In one aspect, the method includes determining a variation in thrust of the aircraft for controlling a variable relating to the aircraft relative to a set point, calculating a first control command signal to be sent to an engine control system in order to obtain the variation in thrust, and transmitting the first control command signal to the engine control system. The controlled variable can be an acceleration along a direction taken by a speed vector among the air speed vector and the ground speed vector and the set point can be an acceleration set point along the direction.

16 Claims, 3 Drawing Sheets

METHOD AND DEVICE FOR CONTROLLING AT LEAST ONE ACTUATOR CONTROL SYSTEM OF AN AIRCRAFT, ASSOCIATED COMPUTER PROGRAM PRODUCT AND AIRCRAFT

CROSS-REFERENCE TO RELATED APPLICATIONS

This application claims benefit under 35 U.S.C. §119 of French Application No. 14 01358, filed Jun. 16, 2014, which is herein incorporated by reference in its entirety.

BACKGROUND

Technological Field

The described technology generally relates to a method for controlling at least one actuator control system of an aircraft for acting on a force applied to the aircraft.

Description of the Related Technology

Generally, an aircraft has an air speed vector and a ground speed vector. It includes at least one engine and an engine control system for causing the varying of a thrust force generated by the engine or engines, the engine control system forms a first actuator control system. Aircraft are usually equipped with auto-thrust systems, also known as auto throttles, which are responsible for automatically maintaining a set point speed or a thrust level via the control of engines. These auto-thrust systems are generally associated with one or more thrust control levers, which may be manipulated by the crew over a variation range corresponding to an engine control parameter, and the crew in addition generally have available an automatic mode in which the set points for speed or engine speed are automatically controlled.

When the automatic mode for auto-thrust systems is not engaged, the crew set an engine speed via the corresponding thrust control lever, which causes a variation in the thrust delivered by the engines, without the speed in any way being controlled, a variation in conditions of the flight and/or the flight path trajectory thus having to be offset by the crew via a corrective action on the flight controls (control stick or control lever) in order to maintain the speed of the aircraft.

Teachings known from the document US 2011/0238277 A1 include a method and a control device of the aforementioned type. This document describes an energy management method and system for managing the variation in energy in an aircraft equipped with at least a propulsion system capable of generating a thrust force on the aircraft. The energy management system for managing the energy variation in energy in an aircraft comprises a capability for determining the variation in current energy of the aircraft, a capability for controlling a variation in energy of the aircraft, and a capability for determining, as a function of the energy variation commanded, a necessary thrust force that is to be generated by the propulsion system in order for the energy variation of the aircraft to be able to tend to the energy variation commanded. The energy variation management system finally comprises a capability for calculating and applying a command order to the propulsion system in order for it to deliver the thrust force required.

However, with such auto-thrust systems or energy variation management systems, evolving change in the flight path trajectory or flight conditions will not necessarily be compensated by a variation in the level of thrust delivered by the engines, which could lead to the loss of speed that would not necessarily be perceived by the crew.

SUMMARY OF THE CERTAIN INVENTIVE ASPECTS

An objective of certain inventive aspects is thus to provide a method and a device for controlling at least one actuator control system that makes it possible to improve the flight safety of the aircraft and to reduce the workload for the crew, while taking into account the evolving variation in the flight path trajectory or flight conditions.

To this end, one inventive aspect is a method of the aforementioned type, wherein the controlled variable is an acceleration along a direction taken by a speed vector among the air speed vector and the ground speed vector, and the set point is an acceleration set point along the direction.

The method can then make it possible, by using as a controlled variable the acceleration along the direction taken by the speed vector among the air speed vector and the ground speed vector, known as acceleration on slope, to control the actuator control system on a controlled basis relative to the acceleration on slope, in a manner such that an evolving variation in the flight path trajectory or flight conditions resulting in a change of the slope or gradient of the aircraft will be compensated by a variation in engine speed so as to hold the acceleration on slope.

Another aspect is a method for controlling at least one actuator control system of an aircraft for acting on a force applied to the aircraft. The aircraft has an air speed vector and a ground speed vector. It includes at least one engine and an engine control system for causing the varying of a thrust force generated by the engine or engines, the engine control system forming a first actuator control system. The method can include determination of a variation in thrust of the aircraft for controlling a variable relating to the aircraft relative to a set point, calculation of a first control command signal to be sent to the engine control system in order to obtain the variation in thrust, and transmission of the first control command signal to the engine control system.

Another aspect is a non-transitory computer readable medium including a computer program comprising of software instructions that, when carried out by a computer, implement such a method.

Another aspect is an electronic control device for controlling at least one actuator control system of an aircraft for acting on a force applied to the aircraft.

Another aspect is an aircraft, such as an airplane, comprising at least one engine, wheels, an engine control system, for causing the varying of a thrust force generated by the engine or engines, with the engine control system forming a first actuator control system, an aerodynamic brake control system, such an air brake system or a negative lift or down force system, for acting on a drag force on the aircraft, the aerodynamic brake control system forming a second actuator control system, a ground traction control system for acting on a tractive force exerted on the ground by the wheels, the ground traction control system forming a third actuator control system, a ground brake control system for acting on a braking force exerted on the ground by the wheels, the ground brake control system forming a fourth actuator control system, and such an electronic control device for controlling at least one of the actuator control systems for acting on a force applied to the aircraft.

Another aspect is applicable to the field of avionics, and more particularly to that of flight control systems, such as auto-thrust systems, systems for controlling airbrakes systems and/or negative lift or down force systems, and their interfaces with the crew.

In accordance with other aspects, the method includes one or more of the following features, taken into consideration in isolation or according to all combinations that are technically possible:

the controlled variable is an acceleration along the direction taken by the air speed vector, and the set point is an acceleration set point along the direction;

the aircraft further includes an aerodynamic brake control system for acting on a drag force on the aircraft, with the aerodynamic brake control system forming a second actuator control system, and the method further includes the following steps:

determination of a variation in drag of the aircraft for controlling the variable relating to the aircraft relative to the set point;

calculation of a second control command signal to be sent to the aerodynamic brake control system in order to obtain the variation in drag, and the transmission of the second control command signal to the aerodynamic brake control system;

the aircraft further comprises wheels and a control system among a ground traction control system and a ground brake control system, for acting on at least one force among a tractive force and a braking force exerted on the ground by the wheels, with the ground traction control system forming a third actuator control system and the ground brake control system forming a fourth actuator control system, and the method further includes the following steps:

determination of a variation in acceleration of the aircraft on the ground for controlling the variable relating to the aircraft relative to the set point;

calculation of at least one ground control command signal among a third control command signal to be sent to the ground traction control system and a fourth control command signal to be sent to the ground brake control system, in order to obtain the variation in ground acceleration, and the transmission of each ground control command signal to the corresponding control system;

the variation determined is a function of an estimated value of the controlled variable, and the estimated value of the controlled variable depends on at least one value among an estimated time derivative of a measured air speed and an estimated acceleration along a direction taken by a speed vector selected from the air speed vector, and the ground speed vector;

the aircraft further comprises a control lever, and the method further includes a measurement and calculation step, for measuring a mechanical variable value relative to the control lever and calculating an acceleration set point value as a function of the measured mechanical variable value;

the value of the acceleration set point is calculated in an iterative manner, as a function of the measured mechanical variable value and a previous value of the acceleration set point;

the aircraft further comprises a control lever, the control lever including at least one predetermined reference position, and when the control lever is positioned in a corresponding predetermined reference position, the value of the acceleration set point is equal to a predefined value associated with the predetermined reference position;

the aircraft further comprises an avionics system capable of generating the acceleration set point, and the value of the acceleration set point is received from the avionics system;

the aircraft further comprises a display screen, and the method further includes a step of displaying, on the screen, the value of the acceleration set point; and the display step includes the displaying of a reference symbol and an acceleration on slope set point symbol, the algebraic deviation on the ordinate (y axis) between the reference symbol and the acceleration on slope set point symbol representing the value of the acceleration set point.

Another aspect relates to a non-transitory computer readable medium including a computer program comprising of software instructions that, when carried out by a computer, implement the method as defined above.

Another aspect relates to an electronic control device for controlling at least one actuator control system of an aircraft for acting on a force applied to the aircraft, the aircraft having an air speed vector and a ground speed vector, the aircraft comprising at least one engine, and an engine control system for causing the varying of a thrust force generated by the engine or engines, with the engine control system forming a first actuator control system; the control device comprising:

a determination capability for determining a variation in thrust of the aircraft for controlling a variable relating to the aircraft relative to a set point;

a calculation and transmission capability for calculating a first control command signal to be sent to the engine control system in order to obtain the variation in thrust, and for transmitting the first control command signal to the engine control system; wherein the controlled variable is an acceleration along a direction taken by a speed vector among the air speed vector and the ground speed vector, and the set point is an acceleration set point along the direction.

In accordance with other aspects, the control device includes one or more of the following features, taken into consideration in isolation or according to all combinations that are technically possible:

the aircraft further comprises an aerodynamic brake control system for acting on a drag force on the aircraft, with the aerodynamic brake control system forming a second actuator control system; the determination capability is further capable of determining a variation in drag of the aircraft for controlling the variable relating to the aircraft relative to the set point; and the device further comprises calculation and transmission capability for calculating a second control command signal to be sent to the aerodynamic brake control system in order to obtain the variation in drag, and for transmitting the second control command signal to the aerodynamic brake control system; and the aircraft further comprises wheels and a control system among a ground traction control system and a ground brake control system, for acting on at least one force among a tractive force and a braking force exerted on the ground by the wheels, with the ground traction control system forming a third actuator control system and the ground brake control system forming a fourth actuator control system; the determination capability is further capable of determining a variation in acceleration of the aircraft on the ground for controlling the variable relating to the aircraft relative to the set point; and the device further comprises a calculation and transmission capability for calculating at least one ground control command signal among a third control command signal to be sent to the ground traction control system and a fourth control command signal to be sent to the ground brake control system in order to obtain the variation in ground acceleration, and for transmitting each ground control command signal to the corresponding control system.

Yet another aspect relates to an aircraft, such as an airplane, comprising at least one engine, wheels, an engine control system, for causing the varying of a thrust force generated by the engine or engines, with the engine control system forming a first actuator control system, an aerodynamic brake control system, such an air brake system or a negative lift or down force system, for acting on a drag force on the aircraft, the aerodynamic brake control system forming a second actuator control system, a ground traction control system for acting on a tractive force exerted on the ground by the wheels, the ground traction control system forming a third actuator control system, a ground brake control system for acting on a braking force exerted on the ground by the wheels, the ground brake control system forming a fourth actuator control system, and an electronic control device for controlling at least one of the actuator control systems for acting on a force applied to the aircraft, wherein the control device is as defined here above.

BRIEF DESCRIPTION OF THE DRAWINGS

These features and advantages will become apparent upon reading the description which will follow, given solely by way of nonlimiting example, and with reference being made to the accompanying drawings in which.

DETAILED DESCRIPTION OF CERTAIN INVENTIVE EMBODIMENTS

Figure 1:
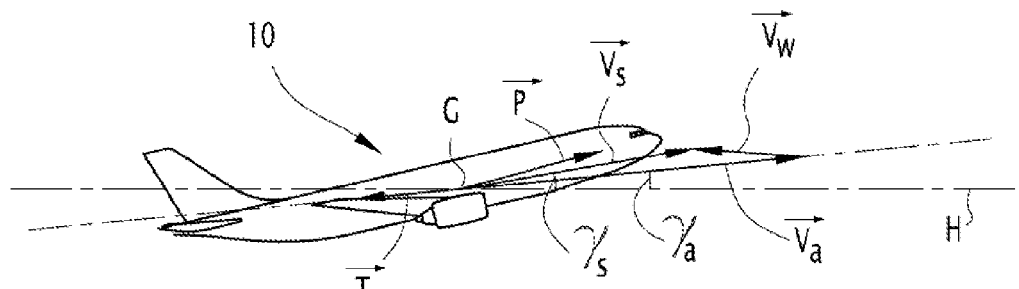
FIG. 1 represents in a schematic manner the thrust and drag forces applied to the aircraft, as well as its air speed vector and ground speed vector.

In FIG. 1, an aircraft 10, such as an airplane, is subjected to a thrust force P and a drag force T, each being applied to the center of gravity G of the aircraft. The aircraft 10 moves relative to the ground along a ground speed vector $V_s$ which forms together with the horizontal H an angle $\gamma_s$ known as ground slope or gradient of the aircraft, and moves relative to the air along an air speed vector $V_a$ which forms together with the horizontal H an angle $\gamma_a$ known as air slope or gradient of the aircraft. The difference between the ground speed vector $V_s$ and the air speed vector $V_a$ corresponds to the wind speed vector $V_w$ which represents the displacement of the air relative to the ground.

In FIG. 1, the vectors of thrust, drag, ground speed, air speed, and wind speed are identified by the vector notations with an arrow. By convention in this patent application and in order to simplify the notations, the above noted vectors are indicated by notations with capital letters and without arrows.

Figure 2:
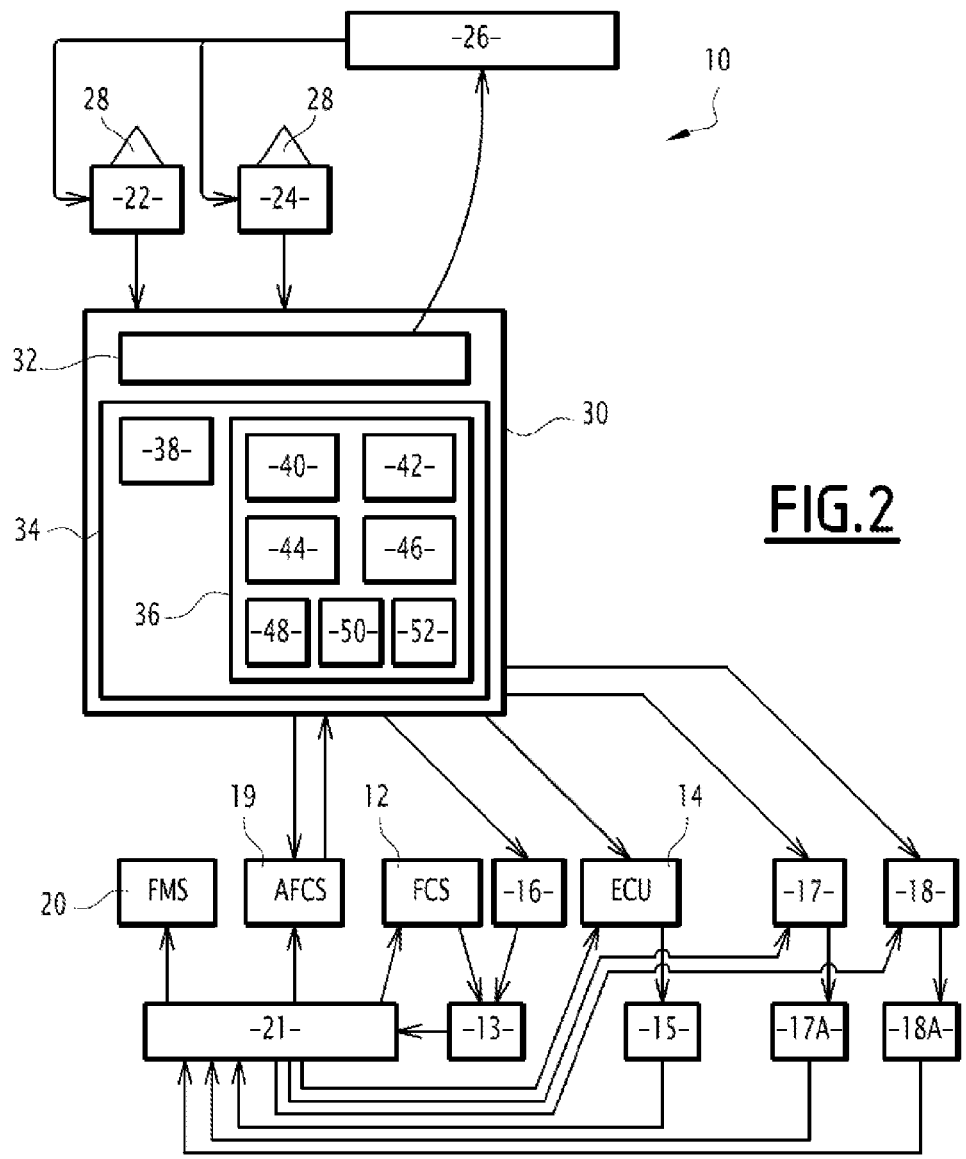
FIG. 2 is a schematic representation of the aircraft shown in FIG. 1, the aircraft comprising several engines, wheels, an engine control system for causing the varying of a thrust force generated by the engines and forming a first actuator control system, an aerodynamic brake control system for acting on a drag force on the aircraft and forming a second actuator control system, a ground traction control system for acting on a tractive force exerted on the ground by the wheels, the ground traction control system forming a third actuator control system, a ground brake control system for acting on a braking force exerted on the ground by the wheels, the ground brake control system forming a fourth actuator control system, a flight control system, an automatic pilot device, control sticks and levers forming the primary control members adapted to be manipulated for the piloting and control of the aircraft, and an electronic control device for controlling at least one of the actuator control systems for acting on the thrust force, in addition optionally on the drag force, and further in addition optionally even when the aircraft is on the ground, on the tractive force of the wheels on the ground and/or on the braking force of the wheels on the ground.

In FIG. 2, the aircraft 10 includes a flight control system (FCS) 12 or fly by wire (FBW), for acting on a set of flight control surfaces and actuators 13 of the aircraft, the flight control surfaces being for example the ailerons, the elevator, or the rudder.

The aircraft 10 includes an engine control system 14, or engine control unit (ECU), for causing the varying of the energy delivered by at least one engine 15 of the aircraft, such as a reactor, a turboprop, or a turbine. The engine control system 14 forms a first actuator control system of the aircraft. When the aircraft 10 includes a plurality of engines 15, the engine control system 14 is capable of causing the varying of the energy delivered by all of the engines 15.

The aircraft 10 also includes an aerodynamic brake control system 16, such as an air brake system, or a negative lift or down force system, for acting on the control surfaces of the assembly 13 and thus acting on the drag force T, with the aerodynamic brake control system 16 forming a second actuator control system.

The aircraft 10 includes a ground traction control system 17 for causing the varying of the energy delivered by at least one additional engine 17A, each additional engine 17A being capable of driving the wheels of a landing gear, not represented. The ground traction control system 17 is thus capable of acting on a tractive force R exerted on the ground by the wheels. The ground traction control system 17 then forms a third actuator control system.

The aircraft 10 also includes a ground brake control system 18 for controlling a brake system 18A and for thus acting on a braking force B exerted on the ground by the wheels. The ground brake control system 18 then forms a fourth actuator control system.

The aircraft 10 includes at least one guidance system, such an automatic flight control system (AFCS) 19, also known as automatic pilot and denoted as PA or AP, or even such as a flight management system (FMS) 20 for managing the flight of the aircraft. In addition, the guidance system can be an auto-thrust device, not shown, also known as auto-throttle.

The aircraft 10 includes a set of sensors 21 capable of measuring various variable values related to the aircraft, in particular the variable values associated with the assembly of flight control surfaces and actuators 13 and with the movement of the aircraft 10, and capable of transmitting the measured values of the variables to: the flight control system 12, the engine control system 14, the aerodynamic brake control system 16, the ground traction system 17, the ground brake control system 18, the automatic flight control system 19, and/or to the flight management system 20.

The aircraft 10 includes one or more control sticks or mini-control sticks 22 and one or more control levers or mini-levers 24, each forming a primary control member able to be appropriately manipulated by the crew 26 of the aircraft for the piloting and control of the aircraft. The mini-lever 24 refers to a control lever with a force feedback towards an equilibrium position. In the subsequent sections, the term "control stick" shall refer to either a control stick or a mini-control stick and the term "control lever" shall refer to either a control lever or mini-control lever.

In addition, the aircraft 10 includes an ancillary control member 28 that makes it possible to increment or decrement a set point, or even to directly designate the value of this set point.

The aircraft 10 includes an electronic control device 30 for controlling at least one of the actuator control systems 14, 16, 17, 18 for acting on a force applied to the aircraft 10, with the force upon which the control device 30 is capable of acting in particular being the thrust force P, or even in addition the drag force T, or even in addition the tractive force R and/or the braking force B exerted via the action of the wheels when the aircraft is on the ground.

The flight control system 12 is known per se, and provides the ability, through its action on the assembly of control surfaces and actuators 13, to cause a variation in attitude of the aircraft 10.

The engine control system 14 forms, by convention in this present application, the first actuator control system, and is known per se. It provides the ability to cause a variation in the thrust of the engines 15 of the aircraft.

The aerodynamic brake control system 16 forms, by convention in this present application, the second actuator control system, and provides the ability to cause a variation in the drag T applied to the aircraft. The aerodynamic brake control system 16 is capable of bringing about the variation in the drag force T via an action on the control surfaces of the assembly 13.

In the example shown in FIG. 2, the aerodynamic brake control system 16 is a separate system that is distinct from the other systems 12, 14, 17, 18, 19 and 20 of the aircraft, in particular the flight control system 12. Alternatively, not shown, the aerodynamic brake control system 16 is integrated into the flight control system 12.

The ground traction control system 17 and the ground brake control system 18 respectively, are known per se, and make it possible to act via the one or more additional engines 17A on the tractive force R, respectively via the brake system 18A, or even via the additional engine 17A, on the braking force B. The ground traction control system 17 and the ground brake control system 18 are thus capable of acting on the tractive force R or the braking force B exerted by means of the wheels when the aircraft is on the ground.

The automatic flight control system 19 and/or the auto-thrust device are known per se, and provide the ability to act on the flight path trajectory of the aircraft.

The flight management system 20 is known per se, and provides the ability to manage a flight plan of the aircraft 10, from the take-off to the landing thereof.

The sensors 21 are in particular capable of providing information and data relating to the position of the elements of the assembly of control surfaces and actuators 13, for example the position of a control surface, and/or related to the state of the engine or engines 15, and/or relating to the high lift configurations, and/or relating to the deployed state or non deployed state of the landing gears.

The sensors 21 are further capable of providing information and data relating to the positioning of the aircraft 10, such as attitudes, accelerations, a ground speed value, an air speed value, a wheel speed value, a route, an altitude, a latitude, a longitude, and/or data relating to the environment of the aircraft 10, desirably relating to the atmosphere in which the aircraft is operating 10 for example a pressure or even a temperature.

Each control stick 22 is capable of enabling a user to control the attitudes of the aircraft 10. In a conventional manner, each control stick 22 is a control lever that is adapted to be operated based on transverse movements, longitudinal movements or any combination of transverse and longitudinal movements. In other words, each control stick 22 is movable along at least two separate and distinct directions of motion, the directions of motion being further perpendicular to each other in the described example.

More specifically, each control stick 22 is capable of enabling a user to control the angle of roll by means of the transverse movements of the control stick, and the angle of pitch or the load factor by means of the longitudinal movements of the control stick.

Each lever 24 is capable of enabling a user to select a value for an acceleration set point Acc_cons along the direction taken by the speed vector from the air speed vector and the ground speed vector, referred to as acceleration on slope set point Acc_cons. Each lever 24 is, for example, a control lever that is adapted to be operated based on longitudinal movements. In other words, each lever 24 is movable along one direction of motion, that is to say the longitudinal direction.

Figure 3:
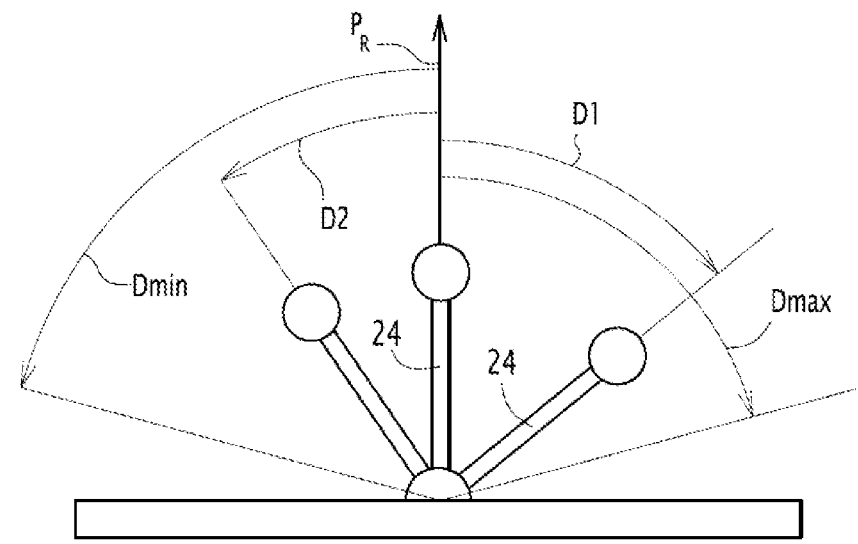
FIG. 3 is a schematic representation of the positions of the lever for selecting various different values of an acceleration set point along a direction taken by a speed vector among the air speed vector and the ground speed vector, referred to as acceleration on slope set point.

Every control stick 22 and every control lever 24 each include a rest position for each direction of motion, desirably corresponding to the middle position between the extreme values of a displacement distance D for each control stick 22 or each control lever 24 along the corresponding direction of motion. In FIG. 3, the rest position is the position corresponding to the axis $P_R$.

In addition, each control stick 22 and each control lever 24 are each a control lever with controllable mechanical force feedback, that is to say controllable, and a mechanical force feedback law defines the mechanical force provided by each control lever 22, 24 as a function of the displacement distance D for each control lever 22, 24 relative to its rest position. According to this complement, each control stick 22 and each control lever 24 are then generally more specifically known as mini.control stick and mini.control lever.

Additionally, the mechanical force feedback law is a function of other parameters, such as the state of the actuators or the guidance systems for example.

In addition, each control lever forming each lever 24 and/or each control stick 22 includes at least one predetermined reference position, the reference position or positions corresponding for example to the position notches, not shown.

In addition, the ancillary control member 28 is attached to each lever 24 and/or optionally to each control stick 22. It is movable along at least one direction, in order to increment or decrement at least one corresponding set point desirably an air speed set point (calibrated airspeed (CAS), true airspeed (TAS), MACH) or ground taxi speed set point. When the ancillary control member 28 is movable in two distinct directions, it is capable of incrementing or decrementing two separate and distinct set points.

The ancillary control member 28 for example has a conical shaped form when it is movable in two distinct directions, or is in the form of a knob when it is movable in one single direction. The ancillary control member 28 associated with each control stick 22 desirably has a conical shaped form, and is also known as a fir, and the one associated with each control lever 24 desirably has a knob shaped form.

The control device 30 includes a display screen 32 and a data processing unit 34 formed, for example by a memory storage 36 and a processor 38 associated with the memory storage 36.

In the example shown in FIG. 2, the control device 30 is separate and distinct from the flight control system 12, the engine control system 14, the aerodynamic brake control system 16, the automatic flight control system 19 and the flight management system 20.

Alternatively, not shown, the control device 30 is integrated with any one of the elements selected from among the following elements: the flight control system 12, the engine control system 14, the aerodynamic brake control system 16, the ground traction control system 17, the ground brake control system 18, the automatic flight control system 19 and the flight management system 20. The data processing unit 34 then corresponds to the data processing unit, not shown, of the element. According to this alternative, the control device 30 is desirably integrated into the flight control system 12.

The memory storage 36 is capable of storing a software program 40 for measuring a mechanical variable value relative to the control lever 24, such as the displacement distance D of the lever 24, or a mechanical force F applied by the crew 26 against the lever 24, forming the control lever, and for calculating a value for the acceleration on slope set point Acc_cons as a function of the mechanical variable value D, F, and optionally of the previous value of the acceleration set point. The memory storage 36 is also capable of storing a software program 42 for acquiring a value for the acceleration on slope set point Acc_cons calculated by an avionics system external to the control device 30, an information display software program 44 for displaying data and information on the screen 32 of the control device, in particular a symbol representing the value of the acceleration on slope set point Acc_cons.

The memory storage 36 is also capable of storing a determination software program 46 for determining a variation in thrust ΔP, on an optional additional basis, a variation in drag ΔT, and on a still more optional additional basis, a variation in acceleration of the aircraft on the ground, for controlling a variable relating to the aircraft relative to a given set point.

According to at least one embodiment, the controlled variable is an acceleration of the aircraft along the direction taken by a speed vector among the air speed vector $V_a$ and the ground speed vector $V_s$, referred to as acceleration on slope, and the set point is the acceleration on slope set point Acc_cons.

The person skilled in the art will understand that, in a general sense, each acceleration defined in this present application, in particular the acceleration on slope or the acceleration of the aircraft on the ground, also known as ground acceleration, is an algebraic acceleration and that a negative value of each acceleration corresponds to a deceleration.

The controlled variable is desirably an acceleration of the aircraft along the direction taken by the air speed vector $V_a$ when the aircraft is in flight and the ground speed vector $V_s$ when the aircraft is on the ground.

The memory storage 36 is also capable of storing a first signal calculation and transmission software program 48 for calculating a first control command signal to be sent to the engine control system 14 in order to obtain the variation in thrust ΔP and for transmitting the first control command signal to the engine control system 14.

On an optional additional basis, the memory storage 36 is also capable of storing a second signal calculation and transmission software program 50 for calculating a second control command signal to be sent to the aerodynamic brake control system 16 in order to obtain the variation in drag ΔT and for transmitting the second control command signal to the aerodynamic brake control system 16.

On an optional additional basis, the memory storage 36 is also capable of storing a third signal calculation and transmission software program 52 for calculating at least one ground control command signal among a third control command signal to be sent to the ground traction control system 17 and a fourth control command signal to be sent to the ground brake control system 18, in order to obtain the variation in ground acceleration, and the transmission of each ground control command signal to the corresponding control system 17, 18.

The processor 38 is capable of loading and executing each software program 40, 42, 44, 46, 48, 50 and 52.

The measurement and calculation software program 40, the acquisition software program 42, the display software program 44, the determination software program 46, the first signal calculation and transmission software program 48, the second signal calculation and transmission software program 50, and the third signal calculation and transmission software program 52, can respectively form the measurement and calculation capability for measuring a mechanical variable relative to the control lever and for calculating a value for the acceleration on slope set point as a function of the mechanical variable measured, the data acquisition capability for acquiring a value of the acceleration on slope set point calculated by an avionics system external to the control device, the display capability for displaying information and data on the screen, the determination capability for determining a variation in thrust, and on an optional additional basis, a variation in drag, and on a still more optional additional basis, a variation in acceleration of the aircraft on the ground, for the aircraft, for controlling the acceleration on slope relative to the acceleration on slope set point, the first signal calculation and transmission capability for calculating and transmitting the first control command signal, the second signal calculation and transmission capability for calculating and transmitting the second control command signal, and the third signal calculation and transmission capability for calculating and transmitting at least one ground control command signal.

Alternatively, the measurement and calculation capability 40, the acquisition capability 42, the display capability 44, the determination capability 46, the first signal calculation and transmission capability 48, the second signal calculation and transmission capability 50, and the third signal calculation and transmission capability 52, are implemented in the form of programmable logic components, or even in the form of dedicated integrated circuits.

The measurement and calculation software program 40 is capable of measuring the value of the displacement distance D of the lever 24, comprised between a minimum value Dmin and a maximum value Dmax, as shown in FIG. 3. By convention, in this present patent application, the minimum value Dmin is negative, the maximum value Dmax is positive, and the rest position of the lever 24, materially represented by the axis $P_R$, corresponds to a null value of the displacement distance D. In the example shown in FIG. 3, the value D1 of the displacement distance D is then a positive value, and the value D2 of the displacement distance D is a negative value.

Alternatively, not shown, the measurement and calculation software program 40 is capable of measuring the value of the mechanical force F applied against the lever 24, comprised between a minimum value of force Fmin and a maximum value of force Fmax.

The measurement and calculation software program 40 is then capable of converting the measured value of the mechanical variable D, F into an acceleration on slope control command increment, with the rest position of the lever 24 corresponding to a null control command increment. The control command increment is then multiplied, by the measurement and calculation software program 40, by a coefficient K depending on a calculation step of the algorithm before it is added to the previous value of the set point. This then is tantamount to performing a time integration of the control command increment in order to obtain an acceleration on slope set point. In other words, the maintaining of the lever 24 in a position other than the rest position or the application of a non-null force F will thus result in the constant evolving of the acceleration on slope set point.

In an optional manner, the coefficient K will be adjusted taking into account the following criteria: the ergonomics of the control stick (displacement distance, height, etc.), the type of aircraft, as well as its engine type and the performance elements of the engine (number of engines operating, etc.), and the phase of flight (take-off, cruise, approach, on the ground) determined among other things by the measurement of aircraft parameters (altitude, speed, configuration of the aircraft).

In an optional manner the acceleration on slope set point is limited between the minimum and maximum acceleration values, calculated moreover in accordance with the configuration of the aircraft and the flight conditions, in order to obtain a limited acceleration on slope set point.

In an optional manner, the measurement and calculation software program 40 is in addition capable of applying a nonlinear function to the limited acceleration on slope set point, this being in order to facilitate the selection by the crew 26 of certain characteristic acceleration values, such as a null acceleration, a maximum acceleration, a minimum acceleration with the airbrakes or negative lift systems retracted.

The acceleration on slope set point Acc_cons thus calculated is then sent, on the one hand, to the display software program 44, and on the other hand to the variation determination software program 46 for determining the variation in thrust P, or in addition even the variation in drag T, or in addition even a variation in acceleration of the aircraft on the ground.

In this example, the mechanical variable D, F relative to the lever 24 then corresponds to an increment/decrement of the acceleration on slope set point Acc_cons.

Alternatively, the mechanical variable D, F relative to the lever 24 corresponds to a level of the acceleration on slope set point Acc_cons. According to this alternative, the measurement and calculation software program 40 is in an analogous manner capable of measuring the value of the mechanical variable D, F relative to the lever 24, comprised between the minimum value Dmin and the maximum value Dmax, respectively the minimum value of force Fmin, and the maximum value of force Fmax. The measurement and calculation software program 40 is then capable of converting the measured value of the mechanical variable D, F into a command, in an optional manner by the application of a nonlinear function in order to make possible the precise selection of low value commands as also of extreme value commands corresponding to the extreme variable values of the control lever 24.

According to this alternative, the measurement and calculation software program 40 is then capable of converting the command thus determined into the acceleration on slope set point Acc_cons, by taking into account in an optional manner the above noted criteria relating to the ergonomics of the control stick, the type of aircraft, and the flight phase.

According to this alternative and in an optional manner, the acceleration on slope set point is also limited between the minimum and maximum values of acceleration previously calculated based on the configuration of the aircraft and the flight conditions.

In addition or alternatively, when the control lever in the form of the lever 24 is positioned in a corresponding predetermined reference position, the value of the acceleration set point Acc_cons is set to be equal to a predefined setting associated with the predetermined reference position. The maximum value of the acceleration set point Acc_cons corresponds for example to a predetermined reference position, such as a mechanical position detent.

The acceleration on slope set point Acc_cons thus calculated is, in a manner analogous to the example previously described above, sent to the display software program 44, on the one hand, and to the determination software program 46, on the other hand.

The data acquisition software program 42 is capable of acquiring a value of the acceleration on slope set point Acc_cons, when the latter is, according to another mode of operation, calculated by an avionics system external to the control device 30. According to this alternative mode of operation, the acceleration on slope set point Acc_cons taken into account by the determination software program 46 for determining the variation in thrust ΔP, or even the variation in drag ΔT, or even the variation in acceleration of the aircraft on the ground, is then the set point value derived from the acquisition software program 42, in place of the one derived from the measurement and calculation software program 40.

According to this other mode of operation, when the aircraft 10 is in flight, the avionics system that is capable of providing the acceleration on slope set point Acc_cons is, for example, the automatic flight control system 19, also denoted as AFCS, and the acceleration on slope set point Acc_cons then satisfies, for example, the following equation $$\text{Acc\_cons} = K_1 \times (V_{cons} - V) \quad (1)$$

where V represents a measurement of the speed of the aircraft 10 to be controlled relative to a speed set point $V_{cons}$; and K1 is the first gain, in configurable value as a function of avionics parameters, such as the air speed of the aircraft (CAS-derived from the English term Calibrated Air Speed, MACH, TAS-derived from the English term True Air Speed), the altitude of the aircraft, the aircraft type, the state of the actuators (for example position of the control surfaces or the engine speed) or configuration of the aircraft.

According to this other mode of operation, when the aircraft 10 is on the ground, the avionics system that is capable of providing the acceleration on slope set point Acc_cons is, for example, an airport navigation system, also known as OANS (derived from the English term Onboard Airport Navigation System) or the automatic flight control system 19 also denoted as AFCS.

Figure 4:
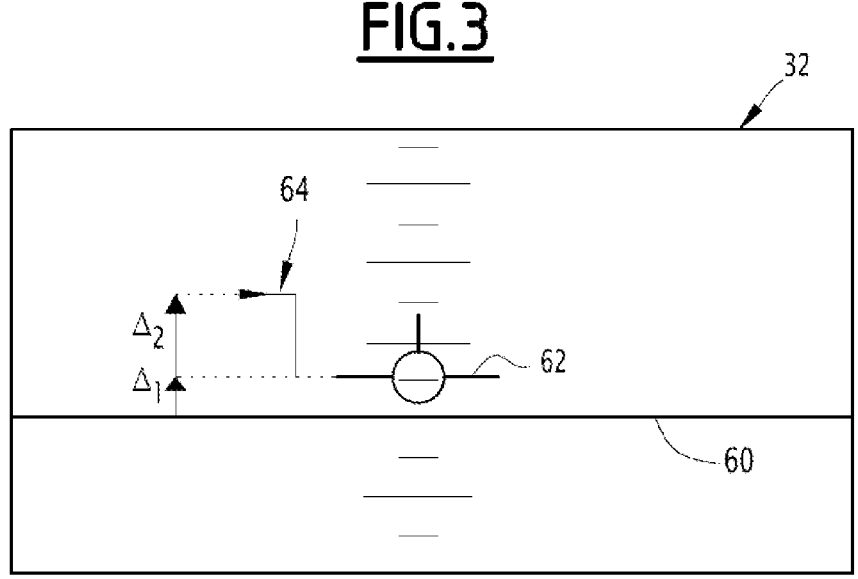
FIG. 4 is a schematic representation of information and data displayed on a screen of the control device shown in FIG. 2, the information and data displayed including in particular a symbol representing the acceleration on slope set point.

The display software program 44 is capable of displaying information and data on the display screen 32, such as an artificial horizon line 60, a speed vector symbol 62 and an acceleration on slope set point symbol 64, as represented in FIG. 4. The display software program 44 is more generally capable of displaying a reference symbol and the acceleration on slope set point symbol 64, and the deviation on the ordinate (y axis) between the reference symbol and the acceleration on slope set point symbol 64 then represents the acceleration on slope set point Acc_cons.

In the example shown in FIG. 4, the reference symbol is the speed vector symbol 62 that indicates the direction of the ground speed vector $V_s$ of the aircraft 10, with the algebraic deviation on the ordinate (y axis) $\Delta_1$ between the horizon line 60 and the speed vector symbol 62 representing the ground slope or gradient $\gamma_s$ of the aircraft. The algebraic deviation on the ordinate (y axis) $\Delta_2$ between the speed vector symbol 62 that forms the reference symbol and the acceleration on slope set point symbol 64 represents the acceleration on slope set point Acc_cons.

Alternatively, not shown, the speed vector symbol is not displayed, and the reference symbol is formed by the artificial horizon line 60. According to this alternative, the deviation on the ordinate between the artificial horizon line 60 and the acceleration on slope set point symbol 64 then represents the acceleration on slope set point Acc_cons.

By way of example, the deviation on the ordinate (y axis) $\Delta_2$ is displayed in degrees, which then makes it possible to view the acceleration on slope set point Acc_cons by using the slope/gradient scale or attitude scale graduated in degrees and known to the person skilled in the art. The deviation on the ordinate $\Delta_2$ then satisfies the following equation:

$$\Delta_2 = \frac{180}{\pi} \times \frac{Acc\_cons}{g}$$

where $180/\pi$ represents the conversion factor for converting radians into degrees;

Acc_cons is the acceleration on slope set point in m/s$^2$; and g is the acceleration due to gravity in m/s$^2$.

Alternatively, not shown, the speed vector symbol is not displayed, and the reference symbol is formed by a speed vector set point symbol. The deviation on the ordinate between the speed vector set point symbol and the acceleration on slope set point symbol 64 then represents the acceleration on slope set point Acc_cons.

Further alternatively, not shown, the speed vector set point symbol is not displayed, and the reference symbol is formed by a horizon line. The deviation on the ordinate (y axis) between the horizon line and the acceleration on slope set point symbol 64 then represents the acceleration on slope set point Acc_cons.

Figure 5:
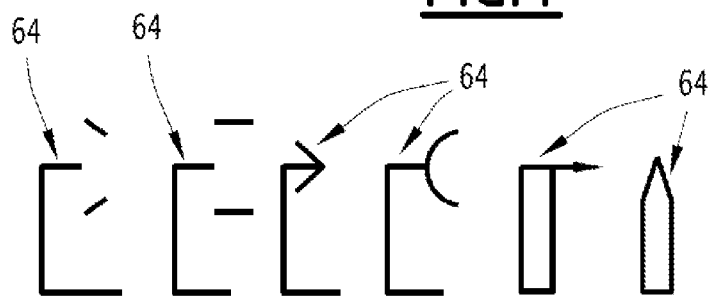
FIG. 5 is a view showing other possible symbols for representing the acceleration on slope set point.

Other symbols 64, for example those visible in FIG. 5, are quite obviously possible for representing the value of the acceleration on slope set point Acc_cons.

The determination 46 software is capable of determining the variation in thrust $\Delta P$ in order to control an estimated value of the acceleration on slope Acc_est relative to the value of the acceleration on slope set point Acc_cons.

On an optional additional basis, the determination software program 46 is capable of determining the variation in drag $\Delta T$ in order to control the estimated value of the acceleration on slope Acc_est relative to the acceleration on slope set point Acc_cons.

On an optional additional basis, the determination software program 46 is capable of determining the variation in acceleration of the aircraft on the ground in order to control the estimated value of the acceleration on slope Acc_est relative to the acceleration on slope set point Acc_cons. The person skilled in the art will note that when the aircraft 10 is on the ground, the ground speed vector $V_s$ and air speed vector $V_a$ are directed in the same direction in the vertical plane, the ground slope or gradient $\gamma_s$ and the air slope or gradient $\gamma_a$ being identical, and the estimated value of the acceleration on slope Acc_est is an estimated value of longitudinal acceleration of the aircraft, the acceleration on slope set point Acc_cons then being a longitudinal acceleration set point.

The estimated value of the acceleration on slope Acc_est depends on at least one value from an estimated time derivative of a measured air speed TAS and an estimated acceleration FPA_ACC along the direction taken by a speed vector selected from the ground speed vector $V_s$ and the air speed vector $V_a$.

The estimated value of the acceleration on slope Acc_est will desirably be calculated using:

an estimate of an air speed TAS in flight or estimate of the ground speed (based on the rotational speed of the wheels, for example) on the ground and an estimated acceleration FPA_ACC along the direction taken by a speed vector selected from the ground speed vector $V_s$ and the air speed vector $V_a$.

The estimated value of the acceleration on slope Acc_est satisfies, for example, the following equation:

$$Acc\_est = H(p)\left[FPA\_ACC + \frac{TAS}{T}\right] \quad (3)$$

where H(p) represents a transfer function with the p being the Laplace variable;

FPA_ACC represents the estimated acceleration of the aircraft 10 along the direction taken by a speed vector selected from the ground speed vector $V_s$ and the air speed vector $V_a$;

TAS represents the measured air speed of the aircraft 10; and

T represents a gain.

The transfer function H satisfies for example the equation:

$$H(p) = \frac{T \times p}{1 + T \times p} \quad (4)$$

where T represents the aforementioned gain.

According to the above noted optional additional alternative and when the aircraft 10 is on the ground, the estimate of the acceleration Acc_est is modified so as to use the speed or speeds of the wheels.

In order to determine the variations in thrust $\Delta P$ and in drag DT the determination software program 46 is capable of calculating a deviation of force $\Delta F$ in accordance with the following equation:

$$\frac{dF}{dt} = \frac{d(P-T)}{dt} = \frac{m \cdot g^2}{V} \times \quad (5)$$

$$\left[ K2 \times \left( \text{Acc\_cons} - \frac{1}{g} \cdot \frac{dV}{dt} \right) + \cos(\gamma_s) \times \frac{\left( V \cdot \frac{d^2Z}{dt^2} - \frac{dZ}{dt} \cdot \frac{dV}{dt} \right)}{V \cdot g} \right]$$

where P and T respectively represent the useful components of the thrust and drag applied to the aircraft 10, that is to say the projection in the vertical plane and along the direction of the air speed vector of the forces F, m, V respectively represent the weight and the air speed of the aircraft 10;

$\gamma_s$ represent the ground slope or gradient of the aircraft;

g represents the acceleration due to gravity;

K2 represents a dimensionless gain, of configurable value in an optional manner as a function of measurements of variable values relating to the aircraft, such as the speed V and altitude, the configuration of the aircraft or the aircraft type;

Acc_cons represents the acceleration on slope set point; and the term $$\cos(\gamma_s) \times \frac{\left( V \cdot \frac{d^2Z}{dt^2} - \frac{dZ}{dt} \cdot \frac{dV}{dt} \right)}{V \cdot g}$$

corresponds to a decoupling term, which may possibly be disregarded.

By convention it is so considered that the thrust is positive when it is directed towards the front of the aircraft and that the drag is positive when it is directed towards the rear of the aircraft. In other words, the two variables are positive under normal conditions of a flight in progress.

The equation (5) is obtained based on the following propulsion equation, derived from the conventional mechanics of the flight while disregarding variations in wind speed:

$$m \cdot \frac{dV}{dt} = P - m \cdot g \cdot \sin(\gamma_s) - T \quad (6)$$

where P, T, m, V and $\gamma_s$ respectively represent the thrust, the drag, the weight, the ground speed, and the ground slope or gradient of the aircraft 10, with g representing the acceleration due to gravity.

The variations ΔP and ΔT are calculated in a manner such that ΔP·ΔT=ΔF with the objective of minimizing the combined use of a non-minimum engine thrust and a non-minimum aerodynamic braking.

For example, if ΔF is positive and as long as the aerodynamic brake control system 16 is able to reduce the drag T, then ΔF is transmitted to aerodynamic brake control system 16. Subsequently, ΔF is transmitted to the engine control system 14.

Conversely, if ΔF is negative and as long as the engine control system 14 is able to reduce the thrust P, then ΔF is transmitted to the engine control system 14. Subsequently ΔF is transmitted to the aerodynamic brake control system 16.

In the preceding equation (5) above, the term dV/dt will desirably be considered to be equal to the estimated value of the acceleration on slope Acc_est, and then calculated by using the preceding equation (3) above.

In other words, the estimated value of the acceleration on slope Acc_est and the value of the acceleration on slope set point Acc_cons may be used to calculate the deviation of force ΔF in accordance with the equation (5), this deviation of force ΔF makes it possible to calculate the variation in thrust ΔP, and in addition the variation in drag ΔT.

The calculation of the variation in ground acceleration is carried out when the aircraft 10 is on the ground, and this calculation is a function of the estimated acceleration Acc_est and the acceleration on slope set point Acc_cons.

On an optional additional basis the acceleration on slope set point Acc_cons is then acquired through the acquisition software program 42, from the airport navigation system OANS. The airport navigation system OANS then forms an avionics system external to the control device 30 and capable of providing the acceleration on slope set point Acc_cons.

By way of example, if the acceleration on slope set point Acc_cons is greater than the estimated value of the acceleration on slope Acc_est, then the calculated variation in acceleration of the aircraft on the ground will be positive. Conversely, if the acceleration on slope set point Acc_cons is lower than the estimated value of the acceleration on slope Acc_est, the variation in ground acceleration will be negative. In other words, the variation in ground acceleration is calculated for controlling the estimated value of the acceleration on slope Acc_est relative to the acceleration on slope set point Acc_cons.

On an optional additional basis, the calculation of the variation in ground acceleration is in addition based on the phase on the ground being considered from among the taxiing phase, the landing phase, and the take-off phase.

As a further example, the magnitude of the variation in ground acceleration is based on the phase on the ground being considered. For example, the magnitude will be more limited during the taxiing phase than during deceleration immediately following touchdown during the landing phase.

According to this optional additional alternative, in the taxi phase, the calculation of the variation in ground acceleration is analogous to the calculation of the variation in the thrust ΔP and the variation in drag ΔT, that is to say, the control command signals are calculated in a manner so as to control the acceleration on slope set point Acc_cons while minimizing the combined use of the braking force B and the tractive force R. In other words, a control command signal is transmitted to the ground brake control system 18 only when the tractive force R cannot decrease any further, and conversely, a control command signal is transmitted to the ground traction control system 17 only when the braking force B cannot decrease any further.

The first calculation and transmission software program 48 is then capable of calculating the first control command signal to be sent to the engine control system 14 in a conventional manner based on the variation in thrust ΔP calculated. The first control command signal typically corresponds to an engine parameter, such as engine speed for a turbo jet engine, or a pitch of a blade for a turboprop engine or even a fuel flow rate, a couple, or a collective pitch for a turbine.

Similarly, the second calculation and transmission software program 50 is capable of calculating the second control command signal to be sent to the aerodynamic brake control system 16, in a conventional manner based on the variation in drag ΔT calculated. The second control command signal typically will correspond to a movement speed set point for flight control surfaces or a position set point for the control surfaces.

Similarly, the third calculation and transmission software program 52 is capable of calculating the ground control command signal or signals from among the third control command signal to be sent to the ground traction control system 17 and the fourth control command signal to be sent to the ground brake control system 18, in order to obtain the variation in ground acceleration. The third control command signal typically will correspond to a traction set point for the wheels of the landing gear, and the fourth control command signal typically will correspond to a wheel braking set point.

Each ground control command signal is developed based on the variation in ground acceleration calculated. By way of example, if the variation in ground acceleration is positive, then the following actions are performed in sequential order until the variation in ground acceleration commanded has been obtained:

the control command signal for the ground brake control system 18 is adjusted so as to command a reduction in the braking;

the control command signal for the aerodynamic brake control system 16 is adjusted so as to command a reduction in the aerodynamic braking;

the control command signal for the ground traction control system 17 is adjusted so as to command a positive traction; and the control command signal for the engine control system 14 is adjusted so as to command an increase in thrust.

According to this example, and conversely, if the variation in ground acceleration is negative, then the following actions are performed in sequential order until the variation in ground acceleration commanded has been obtained:

the control command signal for the engine control system 14 is adjusted so as to reduce the pressure;

the control command signal for the traction control system 17 is adjusted so as to command a decrease of the traction;

the control command signal for the aerodynamic brake control system 16 is adjusted so as to command an increase of the aerodynamic braking until it becomes effective, that is to say until the air speed is higher than a predefined threshold; and the control command signal for the ground brake control system 18 is adjusted so as to command an increase in brake application.

On an optional additional basis, according to this example when the variation in ground acceleration is negative, if the engine or engines 15 permit it and only in the deceleration phase following the touchdown and landing, the control command signal is adjusted so as to command a negative thrust, for example in the case of a "reverse" function of the engine or engines 15.

The person skilled in the art will understand that, when the aircraft is on the ground 10, the control command signals for the engine control system 14 and aerodynamic brake control system 16 may possibly be developed in two different ways:

directly based on the variation in ground acceleration, or as a function of a variation in thrust ΔP and a variation in drag ΔT, in an analogous manner to what has previously been described above when the aircraft 10 is in flight, these variations ΔP and ΔT being then calculated as a function of the variation in ground acceleration, and not based on the equation (5).

Figure 6:
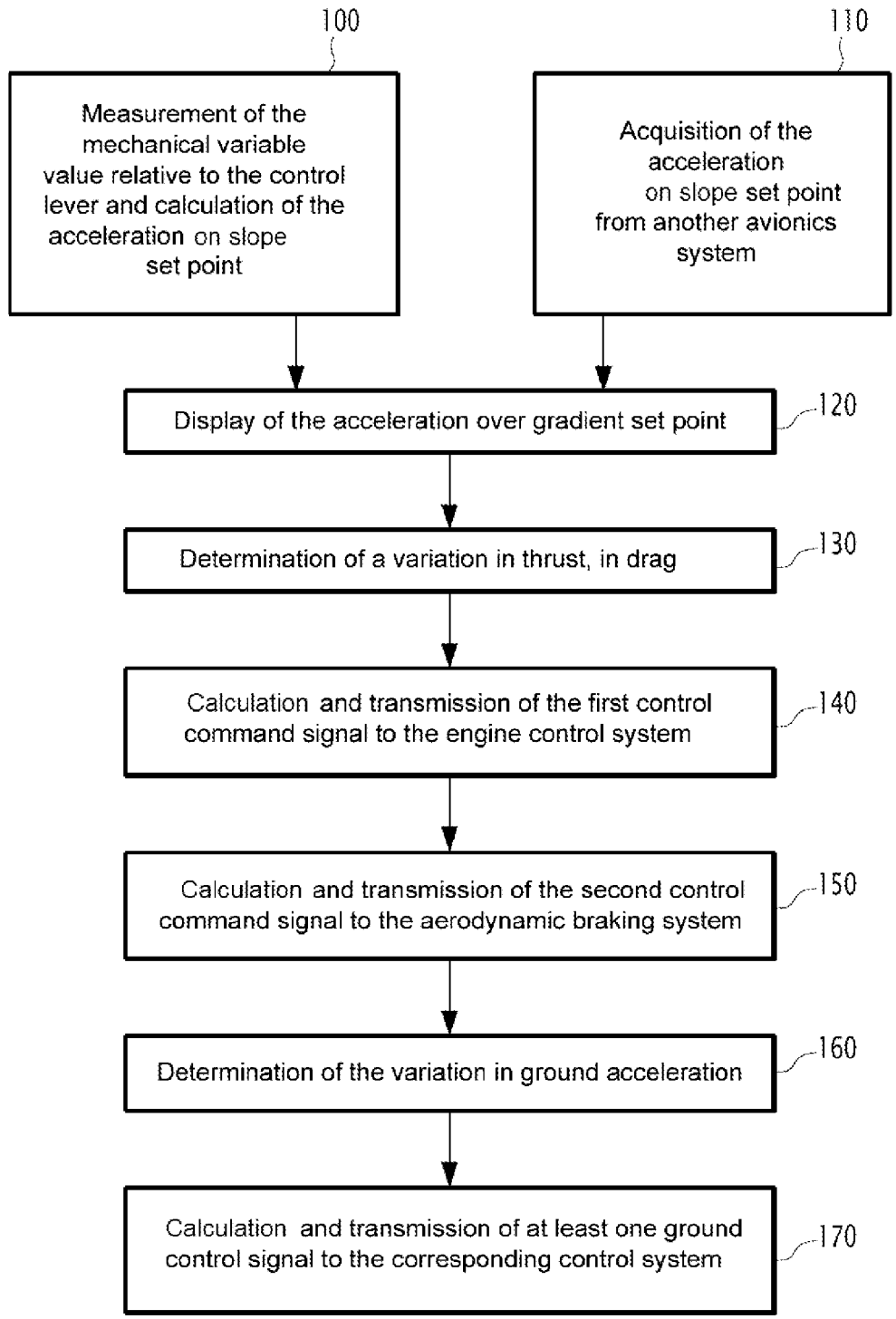
FIG. 6 is a flowchart of a method for controlling at least one of the actuator control systems of the aircraft.

The operation of the control device 30 according to the certain embodiments will now be described with reference being made to FIG. 6 that represents a flowchart of the method according to certain embodiments.

During an initial step 100, the measurement and calculation software program 40 begins by measuring the mechanical variable D, F relative to the control lever 24, and then calculates the acceleration on slope set point Acc_cons based on the measured mechanical variable D, F. As previously described above, the mechanical variable relative to the lever 24 corresponds to an increment of the acceleration on slope set point Acc_cons if the measured value of the mechanical variable D, F is positive, and conversely in a decrement of the acceleration on slope set point Acc_cons if the measured value of the mechanical variable D, F is negative. Alternatively, the mechanical variable D, F relative to the lever 24 corresponds directly to a level of the acceleration on slope set point Acc_cons.

According to another mode of operation, the acceleration on slope set point Acc_cons is not determined based on the mechanical variable relative to the control lever 24, but is acquired during the step 110 by means of the acquisition software program 42 from an avionics system external to the control device 30, such as the automatic flight control system 19 when the aircraft 10 is in flight, and the airport navigation system OANS or again the automatic flight control system 19 when the aircraft 10 is on the ground.

The acceleration on slope set point Acc_cons obtained during the step 100 or during the step 110 is then displayed on the display screen 32 during the step 120, as shown in FIG. 4, the acceleration on slope set point Acc_cons being identified by the acceleration on slope symbol 64. More precisely, the value of the acceleration on slope set point Acc_cons corresponds to the algebraic deviation on the ordinate $\Delta_2$ between the speed vector symbol 62 and the acceleration on slope set point symbol 64 in the example shown in FIG. 4.

As is known per se, the ground slope or gradient $\gamma_s$ of the aircraft corresponds on the display represented in FIG. 4 to the algebraic deviation on the ordinate (y axis) $\Delta_1$ between the horizon line 60 and the speed vector symbol 62.

During the subsequent step 130, the determination software program 46 determines the variation in thrust ΔP, and on an optional additional basis the variation in drag ΔT, in order to control the variable relating to the aircraft relative to the associated set point.

As previously described and according to certain embodiments, the controlled variable is the acceleration along the direction taken by the speed vector, the latter being selected from the air speed vector $V_a$ and the ground speed vector $V_s$, the associated set point is the acceleration on slope set point Acc_cons.

The controlled variable is desirably the acceleration along the direction taken by the air speed vector $V_a$.

By way of example, the value Acc_est estimated in accordance with the equation (3) for acceleration on slope, and the value of the acceleration on slope set point Acc_cons are used to calculate the deviation of force ΔF in accordance with the equation (5), this deviation of force ΔF may be used to calculate the variation in thrust ΔP, and in addition to the variation in drag ΔT.

The variation in thrust ΔP determined is transmitted by the determination software program 46 to the first calculation and transmission software program 48, which then develops, during the step 140, the first control command signal, based on the received value of the variation in thrust ΔP. The first control command signal is then transmitted by the first calculation and transmission software program 48 to the engine control system 14 in order to obtain the variation in thrust ΔP.

On an optional additional basis, the variation in thrust ΔP determined is transmitted by the determination software program 46 to the second calculation and transmission software program 50, which develops, in a similar manner, during the step 150, the second control command signal, based on the received value of the variation in drag ΔT. The second control command signal is then transmitted by the second calculation and transmission software program 50 to the aerodynamic brake control system 16, in order to obtain the variation in drag ΔT.

On a further optional additional basis, when the aircraft 10 is on the ground, for example during the taxiing phase after the landing, the control device 30 is capable of calculating in an analogous manner, the ground control command signals to be sent, respectively, to the ground traction control system 17, and the ground brake control system, 18.

During the step 160, the determination software program 46 then determines the variation in ground acceleration, in order to control the variable relating to the aircraft relative to the associated set point. As previously described above, when the aircraft is on the ground 10, the controlled variable is the estimated value of the acceleration on slope Acc_est which corresponds to the longitudinal acceleration, the ground speed vector $V_s$ and the air speed vector $V_a$ being directed along the same direction in the vertical plane, the ground slope or gradient $\gamma_s$ and the air slope or gradient $\gamma_a$ being identical, and the associated set point is the acceleration on slope set point Acc_cons which then corresponds to the longitudinal acceleration set point of the aircraft 10.

During the subsequent step 170, the determined variation in ground acceleration is transmitted by the determination software program 46 in the third calculation and transmission software program 52, which then develops the third control command signal and/or the fourth control command signal based on the received value of the variation in ground acceleration. The third control command signal and/or the fourth control command signal are then transmitted by the third calculation and transmission software program 52 to the ground traction control system 17 and/or the ground brake control system 18, in order to obtain the variation in ground acceleration.

Thus, the control device 30 according to certain embodiments then provides the ability, while using as controlled variable the acceleration along the direction taken by the speed vector selected from the air speed vector $V_a$ and the ground speed vector $V_s$, known as acceleration on slope, to control the actuator control system 14, 16 in a controlled manner relative to the acceleration on slope, in such fashion that an evolving variation in the flight path trajectory or flight conditions that results in a change of slope or gradient of the aircraft will, unlike the devices of the state of the art, be offset by a variation in engine speed in order to hold the acceleration on slope.

On an optional additional basis, when the aircraft is on the ground 10, the control device 30 also provides the ability to control the ground traction control system 17 and the ground brake control system 18.

The control device 30 according to certain embodiments provides the ability to act on the thrust P, and on an optional basis on the drag T, and on an optional basis even when the aircraft is on the ground, on the tractive force R and/or on the braking force B, in an automatic and ongoing manner while also improving flight safety, a change in gradient of the aircraft being automatically offset in a manner so as to prevent an undesirable variation in the acceleration on slope of the aircraft.

In addition, the feature according to which the controlled variable is the same for determining both the variation in thrust and additionally the variation in drag, along with the set point also being single, provides the ability to compensate any possible change in the slope or gradient of the aircraft 10 in a coordinated and centralized manner based on this single acceleration on slope set point Acc_cons.

The feature according to which the acceleration on slope set point Acc_cons is calculated based on the mechanical variable D, F relative to the lever 24 also makes it possible to provide a simplified interface with the crew 26, and more precisely facilitates the selection of the set point desired by the crew 26. Two selection methods are further provided, the mechanical variable D, F relative to the lever 24 corresponding to either an increment/decrement of the acceleration on slope set point Acc_cons, or directly to a level of the acceleration on slope set point Acc_cons.

The feature according to which the control device 30 also allows for controlling the acceleration on slope Acc_cons by controlling the ground traction control system 17 and/or the ground brake control system 18 provides for a continuity in the use of the control lever 24 during all the phases of flight, on the ground as well as in the air, and allows for reduces the workload during the phases on the ground, that is during the phases of taxiing, landing and take-off.

Thus it may be understood that the method and the control device 30 according to certain embodiments makes it possible to greatly enhance the flight safety of the aircraft 10 and reduce the workload for the crew 26, in particular by taking into account the evolution of the flight path trajectory or flight conditions and by providing a control device that is usable in flight as well as on the ground.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method for controlling at least one actuator control system of an aircraft configured to act on a force applied to the aircraft, the aircraft having an air speed vector and a ground speed vector, the aircraft having at least one engine and an engine control system configured to cause the varying of a thrust force generated by the engine or engines, the engine control system forming a first actuator control system, the method being implemented by an electronic control device and comprising:

determining, during flight of the aircraft, a variation in thrust of the aircraft for controlling a variable relating to the aircraft relative to a set point, the variation in thrust being determined so as to modify the controlled variable to approach the set point;

calculating, during the flight of the aircraft, a first control command signal to be sent to the engine control system in order to obtain the variation in thrust; and transmitting, during the flight of the aircraft, the first control command signal to the engine control system,
wherein the controlled variable is an acceleration along a direction taken by a speed vector among the air speed vector and the ground speed vector, and
wherein the set point is an acceleration set point along the direction.

2. The method of claim 1, wherein the controlled variable is an acceleration along the direction taken by the air speed vector.

3. The method of claim 1, wherein the aircraft further includes an aerodynamic brake control system configured to act on a drag force on the aircraft, the aerodynamic brake control system forming a second actuator control system, and wherein the method further comprises:
determining a variation in drag of the aircraft for controlling the variable relating to the aircraft relative to the set point;
calculating a second control command signal to be sent to the aerodynamic brake control system in order to obtain the variation in drag; and
transmitting the second control command signal to the aerodynamic brake control system.

4. The method of claim 1, wherein the aircraft further comprises wheels and a control system among a ground traction control system and a ground brake control system configured to act on at least one force among a tractive force and a braking force exerted on the ground by the wheels, the ground traction control system forming a third actuator control system and the ground brake control system forming a fourth actuator control system, wherein the method further comprises:
determining a variation in acceleration of the aircraft on the ground for controlling the variable relating to the aircraft relative to the set point;
calculating at least one ground control command signal among a third control command signal to be sent to the ground traction control system and a fourth control command signal to be sent to the ground brake control system in order to obtain the variation in ground acceleration; and
transmitting each ground control command signal to the corresponding control system.

5. The method of claim 1, wherein the determined variation is a function of an estimated value of the controlled variable, and wherein the estimated value of the controlled variable depends on at least one value among an estimated time derivative of a measured air speed and an estimated acceleration along the direction taken by a speed vector selected from the air speed vector and the ground speed vector.

6. The method of claim 1, wherein the aircraft further comprises a control lever, and wherein the method further comprises:
measuring a mechanical variable value relative to the control lever; and
calculating an acceleration set point value as a function of the measured mechanical variable value.

7. The method of claim 6, wherein the value of the set point acceleration is calculated in an iterative manner as a function of the measured mechanical variable value and a previous value of the acceleration set point.

8. The method of claim 1, wherein the aircraft further comprises a control lever, the control lever including at least one predetermined reference position, and wherein, when the control lever is positioned in a corresponding predetermined reference position, the value of the acceleration set point is equal to a predefined value associated with the predetermined reference position.

9. The method of claim 1, wherein the aircraft further comprises an avionics system configured to generate the acceleration set point, and wherein the value of the acceleration set point is received from the avionics system.

10. The method of claim 1, wherein the aircraft further comprises a display screen, and wherein the method further comprises displaying, on the screen, the value of the acceleration set point.

11. The method of claim 10, wherein the displaying the value of the acceleration set point comprises displaying a reference symbol and an acceleration on slope set point symbol, the algebraic deviation on the ordinate between the reference symbol and the acceleration on slope set point symbol representing the value of the acceleration set point.

12. A non-transitory computer readable medium including a computer program comprising of software instructions that, when carried out by a computer, implement the method according to claim 1.

13. An electronic control device for controlling at least one actuator control system of an aircraft for acting on a force applied to the aircraft, the aircraft having an air speed vector and a ground speed vector, the aircraft comprising at least one engine and an engine control system configured to cause the varying of a thrust force generated by the engine or engines, with the engine control system forming a first actuator control system, the control device comprising:
a determination capability configured to determine, during flight of the aircraft, a variation in thrust of the aircraft for controlling a variable relating to the aircraft relative to a set point, the variation in thrust being determined so as to modify the controlled variable to approach the set point;
a calculation and transmission capability configured to: i) calculate, during the flight of the aircraft, a first control command signal to be sent to the engine control system in order to obtain the variation in thrust, and ii) transmit, during the flight of the aircraft, the first control command signal to the engine control system,
wherein the controlled variable is an acceleration along a direction taken by a speed vector among the air speed vector and the ground speed vector, and
wherein the set point is an acceleration set point along the direction.

14. The electronic control device of claim 13, wherein the aircraft further comprises an aerodynamic brake control system configured to act on a drag force on the aircraft, with the aerodynamic brake control system forming a second actuator control system,
wherein the determination capability is further configured to determine a variation in drag of the aircraft for controlling the variable relating to the aircraft relative to the set point, and
wherein the device further comprises a calculation and transmission capability configured to: i) calculate a second control command signal to be sent to the aerodynamic brake control system in order to obtain the variation in drag, and ii) transmit the second control command signal to the aerodynamic brake control system.

15. The electronic control device of claim 13, wherein the aircraft further comprises wheels and a control system among a ground traction control system and a ground brake control system configured to act on at least one force among a tractive force and a braking force exerted on the ground by the wheels, the ground traction control system forming a third actuator control system and the ground brake control system forming a fourth actuator control system, and wherein the determination capability is further configured to determine a variation in acceleration of the aircraft on the ground for controlling the variable relating to the aircraft relative to the set point, and wherein the device further comprises a calculation and transmission capability configured to: i) calculate at least one ground control command signal among a third control command signal to be sent to the ground traction control system and a fourth control command signal to be sent to the ground brake control system in order to obtain the variation in ground acceleration, and ii) transmit each of the ground control command signals to the corresponding control system.

16. An aircraft having an air speed vector and a ground speed vector comprising:

at least one engine;

wheels;

an engine control system configured to cause the varying of a thrust force generated by the engine or engines, the engine control system forming a first actuator control system;

an aerodynamic brake control system configured to act on a drag force on the aircraft, the aerodynamic brake control system forming a second actuator control system;

a ground traction control system configured to act on a tractive force exerted on the ground by the wheels, the ground traction control system forming a third actuator control system;

a ground brake control system configured to act on a braking force exerted on the ground by the wheels, the ground brake control system forming a fourth actuator control system;

and an electronic control device configured to control at least one of the actuator control systems for acting on a force applied to the aircraft, wherein the electronic control device comprises:

a determination capability configured to determine, during flight of the aircraft, a variation in thrust of the aircraft for controlling a variable relating to the aircraft relative to a set point, the variation in thrust being determined so as to modify the controlled variable to approach the set point;

a calculation and transmission capability configured to: i) calculate, during the flight of the aircraft, a first control command signal to be sent to the engine control system in order to obtain the variation in thrust, and ii) transmit, during the flight of the aircraft, the first control command signal to the engine control system, wherein the controlled variable is an acceleration along a direction taken by a speed vector among the air speed vector and the ground speed vector, and wherein the set point is an acceleration set point along the direction.

* * * * *